United States Patent
Shaffer et al.

(10) Patent No.: US 8,036,373 B2
(45) Date of Patent: Oct. 11, 2011

(54) METHODS AND SYSTEMS FOR PROVIDING DYNAMIC MESSAGE CONTENT TO CALLERS ON HOLD

(75) Inventors: Shmuel Shaffer, Palo Alto, CA (US); Sanjeev Kumar, San Francisco, CA (US); Labhesh Patel, San Francisco, CA (US); Mukul Jain, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1120 days.

(21) Appl. No.: 11/370,486

(22) Filed: Mar. 7, 2006

(65) Prior Publication Data

US 2007/0211879 A1    Sep. 13, 2007

(51) Int. Cl.
*H04M 3/00* (2006.01)
*H04M 5/00* (2006.01)
(52) U.S. Cl. ............... 379/266.06; 379/88.16; 379/67.1
(58) Field of Classification Search ............. 379/266.01, 379/265.01, 266.06, 76, 71, 88.16, 88.22–88.25, 379/67.1
See application file for complete search history.

(56) References Cited

U.S. PATENT DOCUMENTS

| | | | | |
|---|---|---|---|---|
| 3,889,291 A | * | 6/1975 | Walker | 360/12 |
| 4,588,865 A | | 5/1986 | Hestad | |
| 5,781,186 A | * | 7/1998 | Jennings | 715/202 |
| 6,044,140 A | * | 3/2000 | Morganstein et al. | 379/211.01 |
| 6,275,793 B1 | * | 8/2001 | Tavernese | 704/201 |
| 6,694,012 B1 | | 2/2004 | Posthuma | |
| 6,724,864 B1 | * | 4/2004 | Denenberg et al. | 379/88.16 |
| 6,728,671 B1 | * | 4/2004 | Johnson | 704/231 |
| 6,885,734 B1 | | 4/2005 | Eberle et al. | |
| 7,257,217 B1 | * | 8/2007 | Lee | 379/265.01 |
| 2003/0046181 A1 | * | 3/2003 | Dow | 705/26 |
| 2004/0146147 A1 | * | 7/2004 | Picard et al. | 379/88.22 |
| 2004/0196964 A1 | * | 10/2004 | Bluvband | 379/88.13 |
| 2005/0008141 A1 | * | 1/2005 | Kortum et al. | 379/266.06 |
| 2005/0069102 A1 | | 3/2005 | Chang | |
| 2005/0129187 A1 | * | 6/2005 | Agapi et al. | 379/76 |
| 2005/0233733 A1 | | 10/2005 | Roundtree | |
| 2006/0010217 A1 | * | 1/2006 | Sood | 709/206 |

OTHER PUBLICATIONS

Jim Meskauskas, iMedia Connection: Media Maze: Neuromarketing, Part 1, Mar. 8, 2006, 3 pages.
Time, The Why of Buy, Mar. 8, 2006, 2 pages.

* cited by examiner

*Primary Examiner* — Ahmad Matar
*Assistant Examiner* — Vedesh Rampersad
(74) *Attorney, Agent, or Firm* — Haynes and Boone, LLP (57) ABSTRACT

Methods and systems for providing dynamic messages to callers on hold are disclosed. In one such method, a telephone call is received into a queue and a first wait time is calculated which corresponds to a first estimated length of time expected to elapse before an agent is available to answer the telephone call. A plurality of message elements are assembled to create a message having a length approximately equal to the first wait time, and playback of the message is initiated. A second wait time is calculated during the playback of the message. The message is modified during playback to have a length approximately equal to the second wait time if the updated estimated length of time is different than the first estimated length of time. In various embodiments, the second wait time may be continuously calculated and the message may be continuously modified during playback.

22 Claims, 4 Drawing Sheets

METHODS AND SYSTEMS FOR PROVIDING DYNAMIC MESSAGE CONTENT TO CALLERS ON HOLD

BACKGROUND

1. Field of the Invention

The present invention generally relates to call centers and, more particularly, to providing content to callers on hold.

2. Related Art

In conventional call centers, the number of incoming telephone calls generally exceeds the number of persons (e.g., agents) available to answer the telephone calls. As a result, incoming telephone calls are typically entered into a queue and distributed as agents become available to respond. Meanwhile, callers (e.g., customers) are forced to remain on hold until they are eventually connected with an agent.

While callers remain on hold, the call center may use various statistical methods to calculate and periodically inform each caller of the estimated length of time expected to elapse before an agent becomes available to answer the caller's individual telephone call. Unfortunately, the actual wait time experienced by each caller can vary in response to unpredictable changes in the number of available agents and the number of prior callers who chose to hang up or remain on hold.

The call center may also provide callers on hold with music, advertising, or other content, all of which is often generally referred to as "music on hold." Such content is often provided in the form of a pre-recorded loop of fixed duration which cannot be readily modified in realtime. However, because of the fixed nature of such content, it cannot be readily adjusted in response to variations in wait times experienced by callers described above. This can lead to dissatisfaction on the part of callers and resource inefficiencies on the part of the call center.

For example, if a caller spends a relatively long time on hold, the same looped content may be repeated to the caller many times. As a result, the caller may become frustrated or lose interest in any advertising or other information included in the content. Conversely, if the caller spends a relatively short time on hold, the caller may hear only part of the content, such as only part of an advertisement, before being connected with an agent. In this case, the advertisement may be rendered ineffective if the caller does not hear a complete message that includes an introduction portion, a body portion, and a closure portion.

Accordingly, there is a need for an improved approach to providing content to callers of a call center that overcomes deficiencies in prior approaches identified above.

BRIEF DESCRIPTION OF THE FIGURES

Like element numbers in different figures represent the same or similar elements.

DETAILED DESCRIPTION

Figure 1:
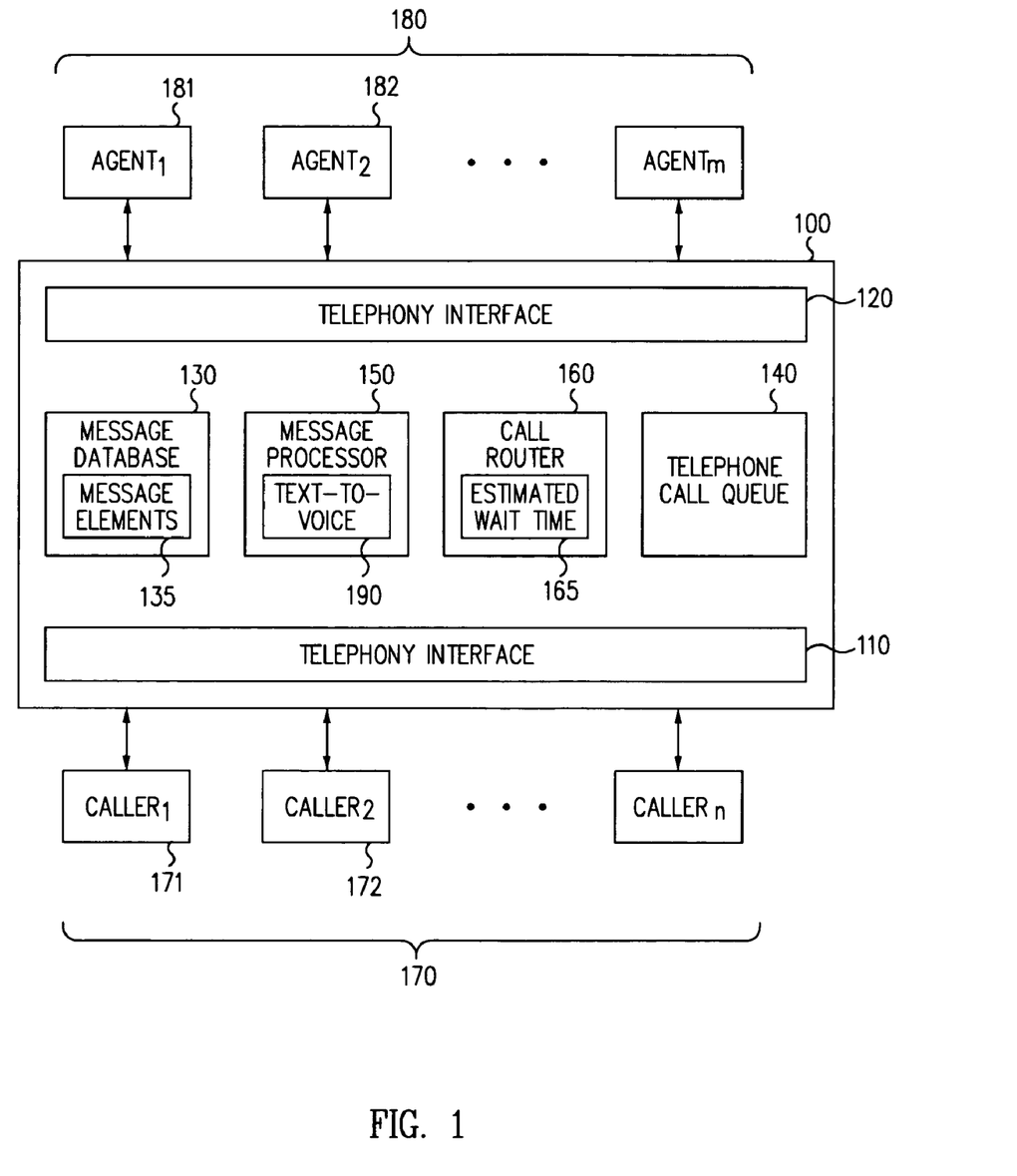
FIG. 1 is a block diagram illustrating a plurality of agents and callers in communication with a call center in accordance with an embodiment of the present invention.

Referring now to the drawings wherein the showings are for purposes of illustrating embodiments of the present invention only, and not for purposes of limiting the same, FIG. 1 is a block diagram illustrating a plurality of agents 180 and callers 170 in communication with a call center 100 in accordance with an embodiment of the present invention. As further described herein, call center 100 can be configured to provide dynamic message content to callers 170 while waiting on hold to speak with agents 180.

In FIG. 1, each caller 170 is associated with one telephone call that has been placed into call center 100. In normal operation, the number of telephone calls/callers 170 (identified as n) will typically exceed the number of available agents 180 (identified as m). As a result, each caller 170 will remain on hold until an agent 180 becomes available to answer the caller's associated telephone call. As further described herein, call center 100 can be implemented to dynamically create messages in realtime to be provided to callers 170 on hold that are waiting to speak with agents 180.

Call center 100 may be implemented using appropriate hardware and/or software components configured to facilitate communication between callers 170 and agents 180. For example, in one embodiment, call center 100 may be configured to provide voice-based support (e.g., customer service) to customers of a business entity, non-profit entity, and/or other organization associated with call center 100. It will be appreciated that call center 100 may also be implemented as a centralized or distributed system as may be desired for particular applications.

Callers 170 are human beings who desire to communicate with agents 180 in order to receive or provide information in relation to agents 180. For example, in one embodiment, callers 170 may be customers of an organization associated with call center 100. Agents 180 are human beings having the task of fielding incoming telephone calls from callers 170. For example, in one embodiment, agents 180 may be customer service representatives of an organization associated with call center 100.

As illustrated, call center 100 includes telephony interfaces 110 and 120, a message database 130, a telephone call queue 140, a message processor 150, and a call router 160. Telephony interfaces 110 and 120 may be implemented with conventional hardware and/or software to interface call center 100 with callers 170 and agents 180, respectively. It will be appreciated that call center 100 may include additional components (not shown) to implement various conventional call center features.

Call router 160 can be implemented to manage queue 140 and distribute telephone calls from queue 140 to agents 180. Call router 160 receives the incoming telephone calls into queue 140, and callers 170 are placed on hold until one of agents 180 becomes available to service the next telephone call in queue 140. Call router 160 can also be implemented with appropriate software or hardware to continuously calculate an estimated wait time 165 for each of the telephone calls. For example, estimated wait time 165 may correspond to an estimated length of time expected to elapse before an agent 180 is available to answer the telephone call.

It will be appreciated that the estimated wait time 165 for each caller 170 can vary in realtime. For example, if an agent (say, agent 181) becomes temporarily unavailable to service telephone calls, the estimated wait time 165 will increase. On the other hand, if an agent (say, agent 182) is added to call center 100, the estimated wait time 165 will decrease. Simi- Table 1 below lists an exemplary set of message elements 135 that may be maintained in message database 130 in accordance with an embodiment of the present invention. It will be appreciated that the message elements 135 of Table 1 are provided for purposes of example only, and that any desired number of message elements 135 (for example, dozens, hundreds, or thousands) may be utilized by call center 100.

TABLE 1

| ELEMENT NUMBER | ELEMENT TYPE | PRECURSOR ELEMENTS | PRIORITY LEVEL | LENGTH (seconds) | SAMPLE TEXT |
|---|---|---|---|---|---|
| 1 | Introduction | None | 1 | 13 | "Welcome to ABC company. We offer a variety of products and services . . ." |
| 2 | Introduction | None | 2 | 5 | "Welcome to ABC company . . ." |
| 3 | Body | 1, 2 | 1 | 20 | "Product A provides these benefits . . ." |
| 4 | Body | 1, 2 | 2 | 10 | "Our Product A . . ." |
| 5 | Body | 3, 4 | 3 | 20 | "In addition to Product A, you may also be interested in our Product B . . ." |
| 6 | Body | 3, 4 | 4 | 35 | "Product A can be supplemented with our product B . . ." |
| 7 | Body | 3, 4 | 5 | 15 | "Product B includes . . ." |
| 8 | Body | 5, 6, 7 | 6 | 20 | "Also, our Product C . . ." |
| 9 | Closure | 5, 6, 7 | 1 | 20 | "In summary, Products A and B . . ." |
| 10 | Closure | 3, 4 | 2 | 20 | "Product A is available for purchase . . ." |
| 11 | Closure | 8 | 3 | 20 | "Products A, B, and C can be found . . ." |
| 12 | Closure | 6 | 4 | 25 | "In closing, Products A and B . . ." |
| 13 | Closure | 3, 4, 5, 6 | 5 | 5 | "You will now be transferred to an agent . . ." | larly, if a caller (say, caller 171) ahead of caller 172 chooses to terminate a telephone call, the estimated wait time 165 for caller 172 will decrease.

Message database 130 stores a plurality of message elements 135 which may be assembled by message processor 150 to dynamically create one or more messages to be provided to callers 170 while on hold. In various embodiments, message elements 135 may be stored as text strings, digital audio recordings, or other digital data formats as may be desired for particular applications. Each message element 135 may correspond to one or more words, phrases, sentences, or other prose which, when assembled with one or more additional message elements 135, can encompass a complete message having an introduction, body, and closure. As further described herein, each of message elements 135 may be associated with a particular message element type (for example, an introduction, body, or closure), a list of other possible preceding message elements 135 (i.e., precursors), a priority level, and a length. In one embodiment, message processor 150 may optionally include text-to-speech converter 190 which prepares audio speech signals from message elements 135 stored as text.

As will be further described herein with reference to the remaining figures, message processor 150 can be implemented to dynamically assemble messages from message elements 135 maintained in message database 130. The assembled messages can be provided to callers 170 while on hold and modified in realtime to closely associate the lengths of the messages with the estimated wait time 165 provided by call router 160.

As set forth above, Table 1 includes 13 exemplary message elements, each of which has an associated element number, a message element type, a precursor element list, a priority level, a length, and various text. For example, message elements 1-2, 3-8, and 9-13 are identified as being introduction, body, and closure element types, respectively. As such, messages assembled from the message elements in Table 1 will begin with one of introduction elements 1-2, following by one or more of body elements 3-8, and end with one of closure elements 9-13.

The precursor list of each of message elements 3-13 identifies which of the other message elements they may immediately follow in order to create a cohesive, understandable message (i.e., a message element may be immediately preceded by one of the message elements of its precursor list). In the example of Table 1, each of body elements 3-4 may follow either of introduction elements 1 or 2, but body elements 5-7 may follow only body elements 3 or 4. Similarly, body element 8 may follow body elements 5, 6, or 7. It will be appreciated that the use of precursor lists allows individual message elements to refer to information in other message elements. For example, as identified in Table 1, body elements 5-7 can introduce new information (i.e., "Product B") and also refer to information previously introduced in body elements 34 (i.e., "Product A").

Each of message elements 1-13 of Table 1 also has an associated priority level which indicates a preferred message element to be selected whenever two or more message elements are available to be selected. As a result, message elements which include higher priority information (for example, advertising information concerning a heavily promoted product or service) may be selected more often to be included in assembled messages provided to callers 170. For example, introduction message element 1 of Table 1 has a higher priority level than introduction message element 2. As a result, message element 1 will generally be selected over message element 2 unless the length of message element 1 (20 seconds) is too long for a complete message (including an introduction, body, and closure) to be included in the current estimated wait time 165. In addition, priority levels can also be used to identify particular message elements to be removed from a message, as further described herein.

Figure 2:
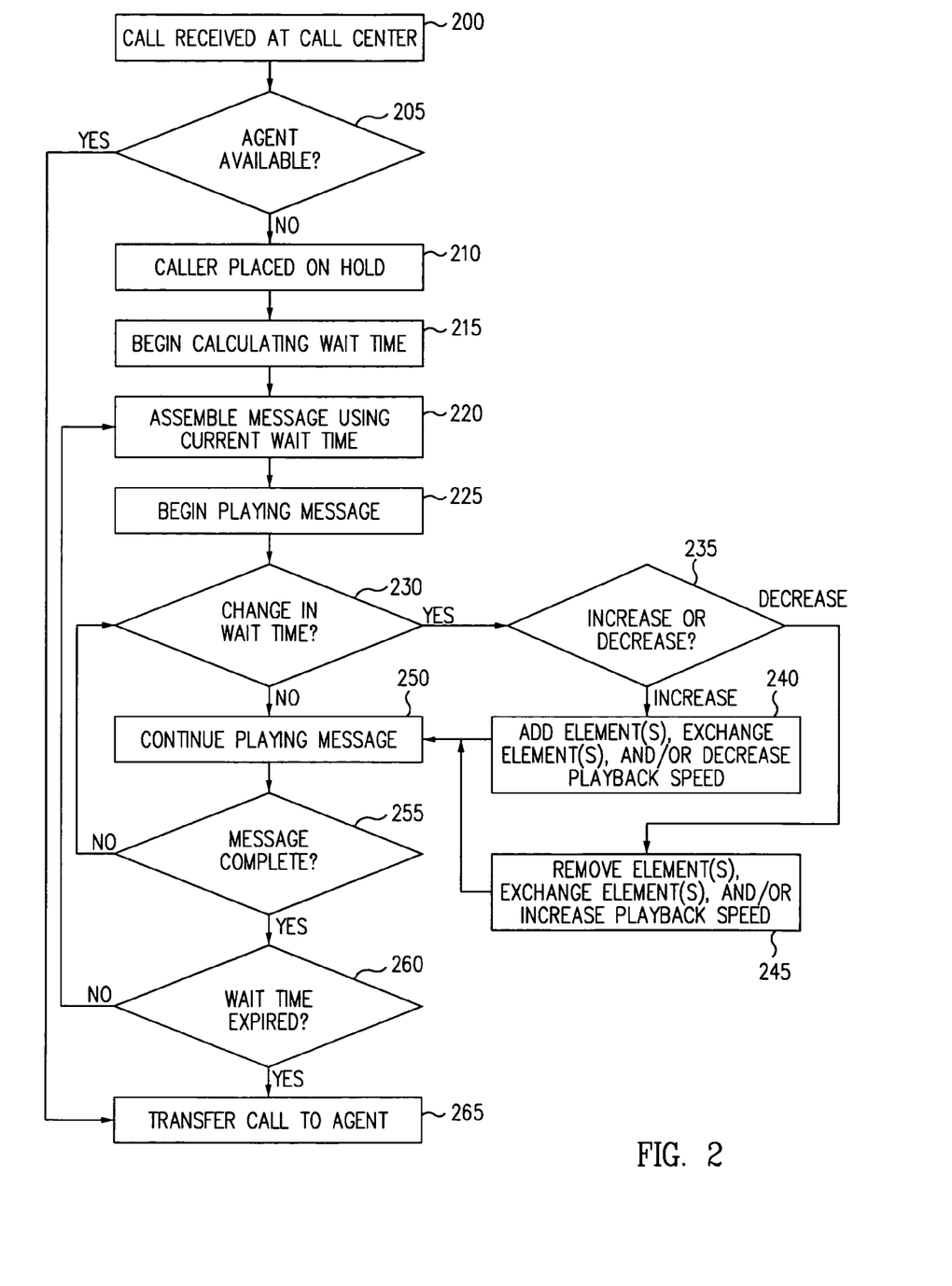
FIG. 2 is a flowchart illustrating a process for providing dynamic message content to callers in accordance with an embodiment of the present invention.

The dynamic creation of messages performed by message processor 150 can be further understood with reference to the flowchart of FIG. 2 which illustrates a process for providing dynamic message content to callers in accordance with an embodiment of the present invention. At initial step 200, a telephone call associated with one of callers 170 is received at call center 100 through telephony interface 110. If an agent 180 is available to take the call (step 205), then the call is transferred to the next available agent 180 (step 265). Otherwise, the caller 170 is placed on hold (step 210) and call router 160 begins calculating the estimated wait time 165 (step 215). Because the estimated wait time 165 can vary for a variety of reasons previously discussed, call router 160 continues to re-calculate and update the estimated wait time 165 during the duration of the process of FIG. 2.

Message processor 150 assembles a message to be provided to the caller 170 during the estimated wait time 165 (step 220). For example, in step 220, message processor 150 may use dynamic path planning techniques to select an introduction message element, one or more body message elements, and a closure message element, all of which collectively add up to a combined length equal or approximately equal to the estimated wait time 165 previously determined in step 215. As previously discussed in relation to Table 1, individual message elements 135 can be selected on the basis of their relative priority within each type, and the selection and ordering of the various message elements 135 can also determined by the precursor list associated with each message element 135.

Figure 3:
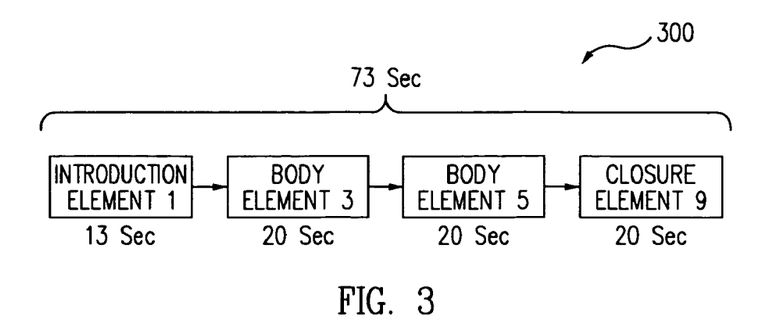
FIG. 3 is a block diagram illustrating a message prepared by a call center in accordance with an embodiment of the present invention.

FIG. 3 is a block diagram illustrating a message 300 prepared by call center 100 at step 220 in accordance with an embodiment of the present invention. In the example of FIG. 3, it is assumed that the estimated wait time 165 was determined in step 215 to be 73 seconds. Accordingly, message 300 is assembled from various message elements 135 of Table 1 which have a collective length of 73 seconds. From inspection of Table 1, it will be appreciated that each element of message 300 appears in the precursor list of the next immediate element (for example, element 1 appears in the precursor list of element 3).

Turning again to FIG. 2, at step 225, message processor 150 initiates playback of the message prepared in step 220 (for example, message 300) to the caller 170 on hold. In one embodiment where message elements 135 are stored as text strings, step 225 can include the conversion of the text of the various selected message elements 135 into audio speech by text-to-speech converter 190. The audio speech may be provided to the caller 170 on hold through telephony interface 110. In another embodiment, message elements 135 are stored as digital audio recordings which are played back through telephony interface 110. It will be appreciated that conventional playback hardware (not shown) can also be provided in call center 100 to further facilitate audio playback.

As previously discussed, call router 160 continuously recalculates and updates the estimated wait time 165 during the process of FIG. 2. If the estimated wait time 165 does not change during the playback of the message (step 230), the message continues to play (step 250) until completed (step 255) or the estimated wait time 165 has changed (step 230).

However, if the wait time has changed (step 230) while the message is playing (for example, while an introduction message element or a body element is playing), then the process of FIG. 2 transitions to step 235 where message processor 150 determines whether the estimated wait time 165 has increased or decreased.

Figure 4A:
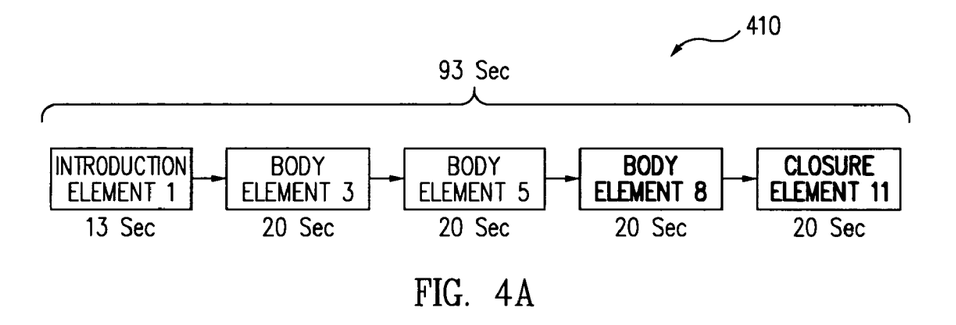
FIGS. 4A-C are block diagrams illustrating lengthened versions of the message of FIG. 3 prepared by a call center in accordance with an embodiment of the present invention.
Figure 4B:
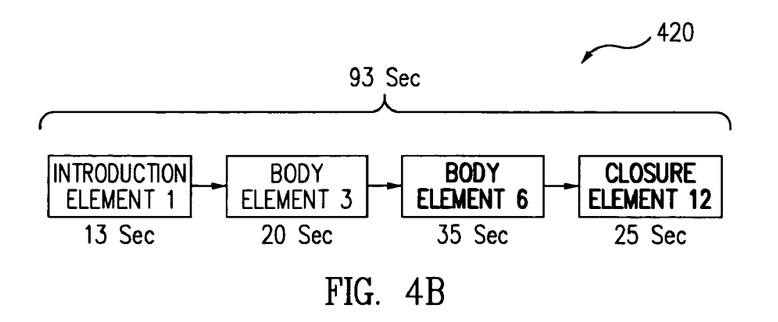
Figure 4C:
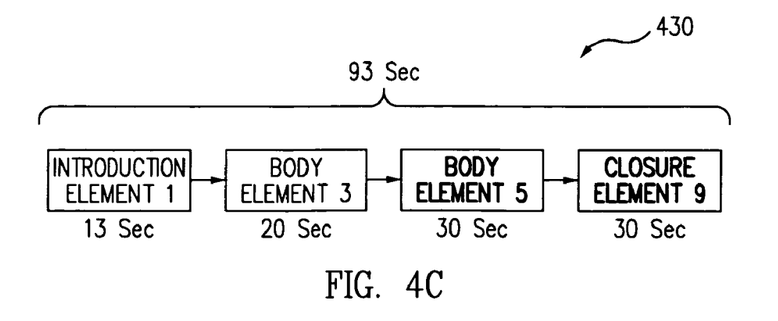

In the case of an increase, the process transitions to step 240 where message processor 150 adds and/or exchanges one or more message elements of message 300, and/or decreases the playback speed of message 300. FIGS. 4A-C are block diagrams illustrating various alternate lengthened versions of message 300 prepared by message processor 150 in step 240 in response to a 20 second increase in the estimated wait time 165 (i.e., an increase from 73 seconds in the example of FIG. 3 to 93 seconds in the examples of FIGS. 4A-C). The examples of FIGS. 4A-C provide various alternate messages that have been lengthened as a result of inserting message elements, exchanging message elements, and/or decreasing the playback speed of message elements.

In the example of FIG. 4A, message 300 has been modified to obtain alternate message 410. As indicated by the elements shown in bold type, body element 8 has been inserted after body element 5, and closure element 9 of message 300 has been exchanged for closure element 11 in message 410. From Table 1 above, it is evident that newly inserted body element 8 is 20 seconds in length which corresponds to the increase in the estimated wait time 165. In addition, because body element 8 is not present in the precursor list of closure element 9 (see Table 1), closure element 9 has been replaced by new closure element 11 which may follow body element 8 according its precursor list.

In the example of FIG. 4B, message 300 has been modified to obtain alternate message 420. As indicated by the elements shown in bold type, body element 5 and closure element 9 of message 300 have been exchanged for body element 6 and closure element 12 of message 420, respectively. As identified in Table 1, body element 6 and closure element 12 have a collective length of 60 seconds which provides a net increase of 20 seconds over the collective length of previous body element 5 and closure element 9 of message 300. It will be appreciated that the positioning of new body element 6 and new closure element 12 have also been selected to correspond to the precursor lists of Table 1.

In the example of FIG. 4C, message 300 has been modified to obtain alternate message 430. As indicated by the elements shown in bold type, body element 5 and closure element 9 remain in message 430, but are played back at a slower speed which causes their collective length to increase from 40 seconds to 60 seconds which provides a net increase of 20 seconds over the previous message 300. As a result, the length of message 430 will correspond to the new estimated wait time 165 of 93 seconds.

Figure 5A:
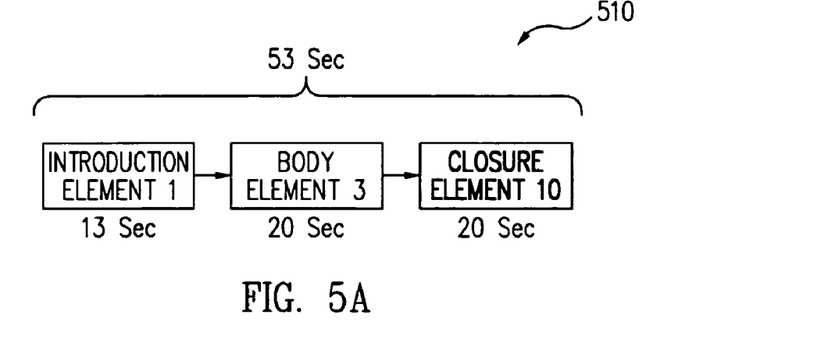
FIGS. 5A-C are block diagrams illustrating shortened versions of the message of FIG. 3 prepared by a call center in accordance with an embodiment of the present invention.
Figure 5B:
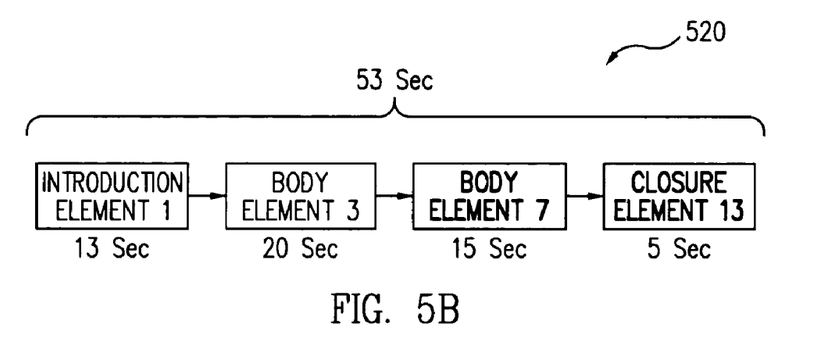
Figure 5C:
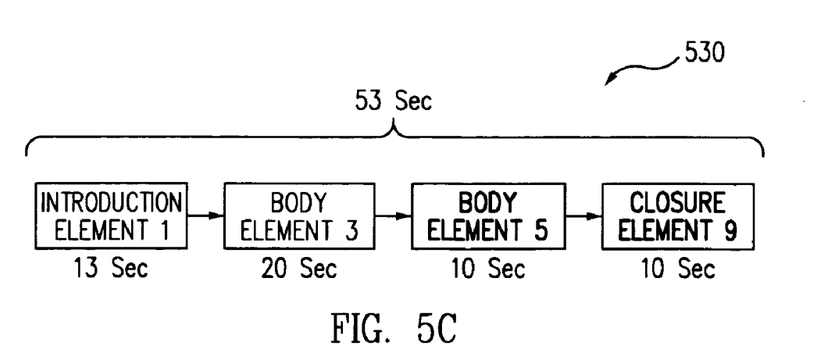

Turning again to FIG. 2, if message processor 150 determines that the estimated wait time 165 has decreased (step 235), then the process transitions to step 245 where message processor 150 removes and/or exchanges one or more message elements of message 300, and/or increases the playback speed of message 300. FIGS. 5A-C are block diagrams illustrating various alternate shortened versions of message 300 prepared by message processor 150 in step 245 in response to a 20 second decrease in the estimated wait time 165 (i.e., a decrease from 73 seconds in the example of FIG. 3 to 53 seconds in the examples of FIGS. 5A-C). The examples of FIGS. 5A-C provide various alternate messages that have been shortened as a result of removing message elements, exchanging message elements, and/or increasing the playback speed of message elements.

In the example of FIG. 5A, message 300 has been modified to obtain alternate message 510. As illustrated, body element 5 has been removed in message 510. In addition, because body element 3 is not present in the precursor list of closure element 9 (see Table 1), closure element 9 has been replaced by new closure element 10 which may follow body element 8 according its precursor list. As indicated in Table 1, new closure element 10 has a length of 20 seconds which corresponds to the length of previous closure element 9. However, with the removal of body element 5, the length of message 510 is 53 seconds which corresponds to the new estimated wait time 165 of 53 seconds. As also indicated in Table 1, remaining body element 3 has a higher priority than removed body element 5. Accordingly, body element 5 has been removed in lieu of body element 3.

In the example of FIG. 5B, message 300 has been modified to obtain alternate message 520. As indicated by the elements shown in bold type, body element 5 and closure element 9 of message 300 have been exchanged for body element 7 and closure element 13 of message 510, respectively. From Table 1 above, it is evident that body element 7 and closure element 13 have a collective length of 20 seconds which provides a net decrease of 20 seconds over the collective length of previous body element 5 and closure element 9 of message 300. It will be appreciated that the positioning of new body element 7 and new closure element 13 have also been selected to correspond to the precursor lists of Table 1.

In the example of FIG. 5C, message 300 has been modified to obtain alternate message 530. As indicated by the elements shown in bold type, body element 5 and closure element 9 remain in message 530, but are played back at a faster speed which causes their collective length to decrease from 40 seconds to 20 seconds which provides a net decrease of 20 seconds over the previous message 300. As a result, the length of message 530 will correspond to the new estimated wait time 165 of 53 seconds.

Turning again to FIG. 2, after message processor 150 increases (step 240) or decreases (step 245) the length of the current message, the process of FIG. 2 transitions to step 250 where it continues to play the current message in its modified form until the message playback has been completed (step 255) or the estimated wait time 165 has changed (step 230). If the estimated wait time 165 changes again, then steps 235, 240, and 245 can be repeated as may be desired to further modify the current message to correspond to the estimated wait time 165.

After the message playback has been completed (step 255) and the estimated wait time 165 has expired (step 260), then call router 160 transfers the call to the next available agent 180. However, if the estimated wait time 165 has not yet expired at step 260 (i.e., an agent 180 is not yet available after the message has played), then the process returns to step 220 where a new message is assembled based on the remaining estimated wait time 165.

If view of the present disclosure, it will be appreciated that messages can be dynamically created by call center 100 to correspond to the estimated wait time 165 determined by the call center. Moreover, the messages can be modified in realtime during playback to further extend or shorten the messages in response to realtime changes in the estimated wait time 165. As a result, callers 170 interacting with call center 100 can receive continuous content while on hold for an agent 180 without experiencing undue repetitions or interruptions of the content. Advantageously, this arrangement allows organizations affiliated with call center 100 to provide cohesive messages having an introduction, body, and closure which may communicate information more effectively than prior approaches.

Other embodiments of call center 100 are also contemplated. For example, in one embodiment, call center 100 may also include a caller database which stores various caller attributes (for example, area code, zip code, occupation, name, or others) associated with one or more of callers 170 which may be used to associate various message elements 135 with particular callers 170 through conventional caller identification techniques, and include such elements in messages provided to such callers 170.

In another embodiment, message processor 150 may also include a counter which is incremented in response to the playback of each message element 135 containing information deemed especially important by the organization associated with call center 100 (i.e., key points in the played message). The selection of a closure message element may be adjusted in realtime such that the closure message element includes a summary statement which incorporates the counter value. For example, the selected closure message element could state: "In summary, ABC company provides [counter value] products that can benefit you . . . " As a result, the information provided by the closure message element can be modified to conform with earlier-played body elements of the message.

In another embodiment, it is contemplated that messages may be lengthened or shortened in realtime by adding or skipping individual words, respectively, based on priority levels associated with the words (i.e., where message elements 135 comprise individual words). Moreover, although call center 100 has been described primarily in relation to text or voice-based messages, it is also contemplated that the principles described herein can also be applied to music or other content which may be desirable to provide to callers 170 while on hold.

Where applicable, various embodiments provided by the present disclosure can be implemented using hardware, software, or combinations of hardware and software. Also where applicable, the various hardware components and/or software components set forth herein can be combined into composite components or separated into sub-components comprising software, hardware, and/or both without departing from the spirit of the present disclosure. In addition, where applicable, it is contemplated that software components can be implemented as hardware components, and vice-versa.

Software in accordance with the present disclosure, such as program code and/or data, can stored on one or more computer readable mediums. It is also contemplated that software identified herein can be implemented using one or more general purpose or specific purpose computers and/or computer systems, networked and/or otherwise.

Where applicable, the ordering of various steps described herein can be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

Having thus described embodiments of the present invention, persons of ordinary skill in the art will recognize that changes may be made in form and detail without departing from the scope of the invention. Thus the invention is limited only by the claims.

What is claimed is:

1. A method of providing dynamic message content in realtime, the method comprising:
receiving a telephone call into a queue of telephone calls;
calculating a wait time corresponding to an estimated length of time expected to elapse before an agent is available to answer the telephone call;
assembling a plurality of message elements to create a message having a length approximately equal to the wait time, wherein each of the plurality of message elements is associated with at least one of a plurality of context sensitive message attributes, and wherein the assembling comprises dynamically selecting and ordering the plurality of message elements in accordance with the message attributes so that the created message is cohesive and provides content that is non-repetitive;
initiating a playback of the message;
recalculating the wait time during the playback of the message to correspond to an updated estimated length of time expected to elapse before the agent is available to answer the telephone call;
modifying the message during the playback of the message to extend or shorten the message in response to a change in the wait time to have a length approximately equal to the wait time and to maintain the message as cohesive, wherein the modifying comprises modifying the plurality of message elements in accordance with the message attributes; and
continuing the playback of the message.

2. The method of claim 1, wherein modifying the message comprises inserting at least one additional message element into the message.

3. The method of claim 2, wherein the at least one additional message element is an individual word.

4. The method of claim 1, wherein modifying the message comprises removing at least one of the message elements from the message.

5. The method of claim 4, wherein the at least one of the message elements is an individual word.

6. The method of claim 1, wherein modifying the message comprises adjusting a playback speed of at least one of the message elements.

7. The method of claim 1, wherein the message elements are text strings, and wherein the playback of the message comprises converting the text strings to speech signals.

8. The method of claim 1, wherein the message elements are digital audio recordings.

9. The method of claim 1, wherein the message attributes comprise an associated priority level.

10. The method of claim 1, wherein the message attributes comprise an introduction message type, a body message type, and a closure message type, wherein the assembling comprises:
selecting an introduction message element from a plurality of message elements associated with the introduction message type;
selecting at least one body message element from a plurality of message elements associated with the body message type to follow the introduction message element; and
selecting a closure message element from a plurality of message elements associated with the closure message type to follow the at least one body message element.

11. The method of claim 10, wherein the message attributes comprise a precursor list, and wherein the at least one body message element is associated with a precursor list value identifying at least one message element preceding the at least one body message element.

12. The method of claim 1, wherein the message attributes comprise an introduction message type, a body message type, and a closure message type, wherein after the modifying operation the message comprises an introduction message element associated with the introduction message type, at least one body message element associated with the body message type following the introduction message element, and a closure message element associated with the closure message type following the at least one body message element, the method further comprising completing playback of the introduction message element, the at least one body message element, and the closure message element during the wait time.

13. The method of claim 1, wherein the telephone call is associated with a caller, the method further comprising placing the caller on hold prior to initiating the playback of the message.

14. The method of claim 1, further comprising transferring the telephone call to the agent after playback of the message is completed.

15. The method of claim 1, further comprising repeating the method for a second telephone call.

16. A call center comprising:
a queue of telephone calls;
a database of message elements;
a processor in communication with the queue and the database of message elements; and
a memory in communication with the processor, the memory comprising a machine-readable medium having executable instructions adapted to instruct the processor to perform a method of providing dynamic message content in realtime, the method comprising:
calculating a wait time corresponding to an estimated length of time expected to elapse before an agent is available to answer a one of the telephone calls,
assembling a plurality of the message elements from the database of message elements to create a message having a length approximately equal to the wait time, wherein each of the plurality of message elements is associated with at least one of a plurality of context sensitive message attributes, and wherein the assembling comprises dynamically selecting and ordering the plurality of message elements in accordance with the message attributes so that the created message is cohesive and provides content that is non-repetitive,
initiating a playback of the message,
recalculating the wait time during the playback of the message to correspond to an updated estimated length of time expected to elapse before the agent is available to answer the telephone call,
modifying the message during the playback of the message to extend or shorten the message in response to a change in the wait time to have a length approximately equal to the wait time and to maintain the message as cohesive, wherein the modifying comprises modifying the plurality of message elements in accordance with the message attributes, and
continuing the playback of the message.

17. The call center of claim 16, further comprising:
a first telephony interface adapted to facilitate communication between the call center and a plurality of callers associated with the telephone calls; and a second telephony interface adapted to facilitate communication between the call center and a plurality of agents.

18. The call center of claim 16, wherein modifying the message comprises inserting at least one additional message element from the database of message elements into the message.

19. The call center of claim 16, wherein modifying the message comprises removing at least one of the message elements from the message.

20. The call center of claim 16 wherein modifying the message comprises adjusting a playback speed of at least one of the message elements.

21. A system for providing dynamic message content in realtime to callers on hold, the system comprising:
  means for receiving a telephone call into a queue of telephone calls;
  means for calculating a wait time corresponding to an estimated length of time expected to elapse before an agent is available to answer the telephone call;
  means for assembling a plurality of message elements to create a message having a length approximately equal to the wait time, wherein each of the plurality of message elements is associated with at least one of a plurality of context sensitive message attributes, and wherein the assembling comprises dynamically selecting and ordering the plurality of message elements in accordance with the message attributes so that the created message is cohesive and provides content that is non-repetitive;
  means for initiating a playback of the message;
  means for recalculating the wait time during the playback of the message to correspond to an updated estimated length of time expected to elapse before the agent is available to answer the telephone call;
  means for modifying the message during the playback of the message to extend or shorten the message to generate a modified message in response to a change in the wait time to have a length approximately equal to the wait time and to maintain the message as cohesive, wherein the plurality of message elements in the modified message is in accordance with the message attributes; and
  means for continuing the playback of the modified message.

22. The system of claim 21, further comprising means for transferring the telephone call to the agent after playback of the message is completed.

* * * * *